United States Patent [19]

Hsieh

[11] 4,179,480
[45] Dec. 18, 1979

[54] BLENDS OF CYCLODIENE-CONTAINING COPOLYMERS AND BLOCK COPOLYMERS HAVING IMPROVED HIGH TEMPERATURE GREEN TENSILE STRENGTH

[75] Inventor: Henry L. Hsieh, Bartlesville, Okla.

[73] Assignee: Phillips Petroleum Company, Bartlesville, Okla.

[21] Appl. No.: 739,175

[22] Filed: Nov. 5, 1976

[51] Int. Cl.² .............................................. C08L 53/02
[52] U.S. Cl. ...................................... 525/99; 526/308
[58] Field of Search ...................................... 260/876 B

[56] References Cited

U.S. PATENT DOCUMENTS

| | | | |
|---|---|---|---|
| 3,251,905 | 5/1966 | Zelinski | 260/79.5 R |
| 3,281,383 | 10/1968 | Zelinski et al. | 260/880 B |
| 3,639,521 | 2/1972 | Hsieh | 260/880 B |
| 3,668,263 | 6/1972 | Morrison et al. | 260/665 R |
| 3,776,964 | 12/1973 | Morrison et al. | 260/665 R |
| 3,954,692 | 5/1976 | Downey | 260/876 B |
| 4,046,838 | 9/1977 | Feeney | 260/876 B |

Primary Examiner—Harold D. Anderson

[57] ABSTRACT

Blends of a cyclodiene-containing copolymer, such as a cyclohexadiene-styrene copolymer, with a linear or radial block copolymer, such as a styrene-butadiene-styrene block copolymer, exhibit improved high temperature green tensile strength as compared to the block copolymer alone. A process is provided for producing such blends.

16 Claims, No Drawings

BLENDS OF CYCLODIENE-CONTAINING COPOLYMERS AND BLOCK COPOLYMERS HAVING IMPROVED HIGH TEMPERATURE GREEN TENSILE STRENGTH

This invention relates to improved polymer compositions and to a process for producing them. More particularly, this invention relates to polymer blends having improved high temperature tensile strength.

Linear and radial block copolymers of the type A-B-A and $Z(B-A)_n$, respectively, have generally found wide acceptance and application due to their unique combination of high strength, elasticity and thermoplasticity in an uncured or non-chemically crosslinked condition. However, these copolymers generally exhibit a decrease in uncured or green tensile strength with increasing temperature. Such decrease in green tensile strength has placed limitations on their use at higher temperatures, i.e., above about 100° F.

It is an object of the present invention to provide a process for improving the high temperature green tensile strength of a block copolymer.

It is another object of this invention to provide a composition of matter comprising a block copolymer which composition exhibits improved high temperature green tensile strength.

Other objects, aspects and advantages of the present invention will be apparent to those skilled in the art from a reading in the detailed specification and the appended claims.

In accordance with the present invention, I have discovered that the green tensile strength of a block copolymer of the type A-B-A or $Z(B-A)_n$, as hereinafter described, can be improved by the addition thereto of a modifying amount of a cyclodiene-containing copolymer, also described hereinafter.

The block copolymers suitable for use in the present invention are linear and radial copolymers of acyclic conjugated dienes and vinyl-substituted aromatic compounds having the structures A-B-A and $Z(B-A)_n$, respectively. In these copolymers, A represents an essentially homopolymer block of a vinyl aromatic compound and B is selected from the group consisting of an essentially homopolymer block of an acyclic conjugated diene having from 4 to 8 carbon atoms per molecule and a random copolymer block of at least one acyclic conjugated diene and at least one vinyl aromatic compound. Z is derived from a polyfunctional compound having 2 to 4 reactive sites and n is an integer having a value of 2 to 4. In general, the weight ratio of the vinyl aromatic compound to the acyclic conjugated diene is in the approximate ratio of 1:4 to 4:1. Preferably, the amount of the vinyl aromatic compound ranges from about 20 to about 40 weight percent of the block copolymer.

The vinyl-substituted aromatic compounds useful in the preparation of the A blocks of the above-described copolymers contain from 8 to 12 carbon atoms. Examples of such monomers include: styrene, alpha-methylstyrene, 4-ethylstyrene, 1-vinylnaphthalene and the like. In a presently preferred embodiment the vinyl monomer is styrene.

The conjugated dienes suitable for use in the preparation of the B blocks of the above-described copolymers are those containing 4 to 8 carbon atoms per molecule. Examples of such monomers include: 1,3-butadiene, isoprene, 1,3-pentadiene, 2,4-hexadiene, 1,3-octadiene, 5,6-diethyl-1,3-octadiene and the like. 1,3-Butadiene and isoprene are presently preferred due to their ready availability.

Block copolymers of the structure A-B-A are prepared by methods well known in the art, such as, for example, the sequential addition of monomers to a system utilizing an organolithium initiator, as described in U.S. Pat. No. 3,639,521.

Block copolymers of the structure $Z(B-A)_n$ are prepared using polyfunctional organolithium initiators or polyfunctional coupling agents by methods well known in the art as described, for example, in U.S. Pat. Nos. 3,251,905, 3,281,383 and 3,639,521.

The cyclodiene-containing copolymers suitable for use in the present invention are copolymers comprising:

(1) a 1,3-cyclodiene compound having from 5 to 20 carbon atoms per molecule selected from the group consisting of 1,3-cyclohexadiene and substituted derivatives thereof represented by the formula

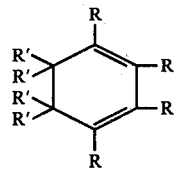

and 1,3-cyclopentadiene and substituted derivatives thereof represented by the formula

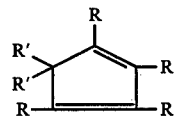

wherein in each of the above formulas each R is individually selected from the group consisting of hydrogen, methyl and ethyl, and each R' is individually selected from the group consisting of hydrogen, alkyl having from 1 to 6 carbon atoms, cycloalkyl having 5 or 6 carbon atoms, phenyl and methylcyclopentyl; and (2) at least one monomer selected from the group consisting of acyclic conjugated dienes having from 4 to 8 carbon atoms per molecule, vinyl-substituted aromatic compounds having from 8 to 14 carbon atoms per molecule, and mixtures thereof in which the weight ratio of the acyclic conjugated diene to the vinyl aromatic compound ranges from about 99:1 to about 1:99.

It is also within the scope of this invention to employ the hydrogenated derivatives of the above cyclodiene-containing copolymers.

The number average molecular weight (Mn) of the normally solid cyclodiene-containing copolymers suitable for use in the present invention and their hydrogenated derivatives, is generally in the range of 10,000 to 1,000,000, preferably from 30,000 to 200,000. The cyclodiene-containing copolymer is prepared by polymerizing at least one 1,3-cyclodiene and at least one acyclic conjugated diene, vinyl aromatic compound, or mixture thereof in the presence of an organolithium initiator. The organolithium initiators suitable for use in preparing the 1,3-cyclodiene-containing copolymers have the formula $R''Li_x$, wherein $R''$ is a hydrocarbon radical of valence x having from 1 to 20 carbon atoms selected from the group consisting of aliphatic, cycloaliphatic and aromatic radicals, and x is an integer having a value of 1 to 4. Examples of suitable organolithium compounds include: methyllithium, isopropyllithium, n-butyllithium, t-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,5-dilithionaphthalene, 1,2-dilithio-1,2-diphenylethane, 9,10-dilithio-9,10-dihydroanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-tetralithodecane, 1,5,10,20-tetralithioeicosane, 1,2,3,5-tetralithiocyclohexane and 1,2,3,5-tetralithio-4-hexylanthrancene.

Other suitable organolithium initiators are the alpha-lithio multisubstituted dialkylbenzenes and corresponding oligomers such as those represented by the formula

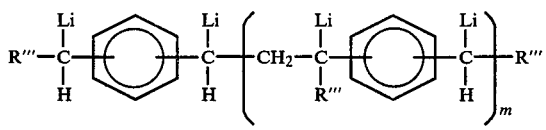

wherein R''' is a linear or branched alkyl containing from 2 to 12 carbon atoms and m is an integer from 0 to 2. These compounds are usually used as a mixture in a suitable solvent. One commonly used mixture has as its principal component 1,3-bis-(1-lithio-3-methylpentyl) benzene, hereinafter referred to as DiLi-3. Additional information regarding such compounds can be found in U.S. Pat. Nos. 3,668,263 and 3,776,964.

The amount of initiator employed depends upon the polymer molecular weight desired and thus varies widely. Generally, the amount of initiator is in the approximate range of 0.1 to 100 milliequivalents of Li per 100 grams of total monomer.

Examples of 1,3-cyclodienes suitable for use in preparing the cyclodiene-containing copolymers include: 1,3-cyclopentadiene, 2-methyl-1,3-cyclopentadiene, 5-ethyl-1,3-cyclopentadiene, 1,3-cyclohexadiene, 1-ethyl-1,3-cyclohexadiene, 1,4-dimethyl-5-isopropyl-1,3-cyclohexadiene, 2,3-dimethyl-5,6-diphenyl-1,3-cyclohexadiene, 2,3-diethyl-5-(n-butyl)-6-phenyl-1,3-cyclohexadiene, 1-methyl-5-cyclohexyl-1,3-cyclohexadiene and the like.

Suitable acyclic conjugated dienes and vinyl substituted aromatic compounds have been set forth previously in describing the block copolymers A-B-A and Z(B-A)$_n$.

The portion of cyclodiene units in the cyclodiene-containing copolymer can vary from 10 to 90 weight percent, preferably from 40 to 80 weight percent. The remaining portion of the copolymer can be derived solely from a single acyclic conjugated diene or a mixture of acyclic conjugated dienes, solely from a single vinyl aromatic compound or a mixture of vinyl aromatic compounds, or from a mixture of one or more acyclic conjugated dienes and one or more vinyl aromatic compounds. In the latter instance, the weight ratio of acyclic conjugated diene units to vinyl aromatic units is generally in the range of about 99:1 to 1:99, preferably about 3:1 to 1:3. The cyclodiene-containing copolymers can be block or random in structure.

The polymerization reaction is carried out in the presence of a diluent selected from the group consisting of linear and branched paraffin and cycloparaffin hydrocarbons having from 4 to 12 carbon atoms per molecule. Suitable diluents include 2,3-dimethylbutane, n-heptane, 2,2,4-trimethylpentane, methylcyclopentane and cyclohexane. Cyclohexane is presently preferred because it provides a higher conversion and a higher reaction rate.

It is optional, though preferred to carry out the polymerization reaction in the presence of a small amount of an ether or a tertiary amine. If used, the amount of ether or tertiary amine can range from about 0.01 to 50 phm (parts by weight per 100 parts by weight of total monomer), preferably 0.1 to 10 phm. The presence of the ether or tertiary amine increases the conversion and the polymerization rate. Suitable ethers and tertiary amines include: tetrahydrofuran, p-dioxane, dimethyl ether, diethyl ether, di-n-butyl ether, ethyl-n-butyl ether, anisole, diphenyl ether, triethylamine, N,N,N',N'-tetramethyl ethylenediamine, tri-n-propylamine and N,N-dimethylaniline.

The polymerization reaction can be carried out under autogenous pressure or at any suitable pressure sufficient to maintain the reaction mixture substantially in the liquid phase.

The polymerization temperature can vary broadly, but generally is in the range of about 0° to about 300° F., preferably about 30° to 150° F.

The time required for the polymerization is dependent upon such factors as the molecular weight desired, quantity of initiator employed, temperature and the like, but generally is in the range of a few minutes to 48 hours.

The process can be carried out batchwise or as a continuous process.

Various substances, such as water, carbon dioxide and oxygen, are known to be detrimental to the initiator. It is therefore desirable that the reactants and the diluent be freed of these materials. Any known method for removing these contaminants can be used. Although it is preferred that the polymerization be carried out under anhydrous or substantially anhydrous conditions, it is to be understood that small amounts of the above initiator inactivating materials can be tolerated in the reaction mixture, so long as their concentration is insufficient to cause complete deactivation of the initiator.

At the completion of the polymerization reaction, the reaction mixture is treated to inactivate the polymer-lithium and any initiator remaining and precipitate the product, such as by adding water or an alcohol to the mixture. The polymer is then separated and recovered by any suitable means, such as by decantation or filtration.

The cyclodiene-containing copolymers described above can be hydrogenated by various methods well known in the art, such as by the method disclosed in U.S. Pat. No. 3,635,685.

Normally, at least about 65 percent of the olefinic unsaturation of the copolymer is removed by hydrogenation; however, it is understood that copolymers with any portion of the olefinic unsaturation hydrogengated are within the scope of the invention. Also, in instances where the unhydrogenated copolymer contains aromatic unsaturation, removal of such aromatic unsaturation to any degree by hydrogenation is within the scope of the copolymers employed according to the invention.

In accordance with the invention, the uncured or green tensile strength of a block copolymer of the type A-B-A or Z(B-A)$_n$ is improved by blending from 5 to 100 parts by weight of the cyclodiene-containing copolymer with 100 parts by weight of the block copolymer, preferably by blending 10 to 50 php of the cyclodiene-containing copolymer with the block copolymer.

The blends of this invention can contain other ingredients normally employed to give desirable properties to the polymer. Such ingredients include antioxidants, antiozonants, carbon black, mineral fillers, colorants, reinforcing fillers, ultraviolet stabilizers, heat stabilizers and the like.

The blends of this invention can be prepared by any conventional method which will provide an essentially homogeneous mixture of the copolymers and any other blend recipe ingredients. The copolymers can be solution blended by dissolving the cyclodiene-containing copolymer and the block copolymer in a suitable solvent, such as toluene, to give a homogeneous solution, and the polymeric blend recovered by precipitation or coagulation with a non-solvent, such as isopropyl alcohol. Other suitable methods include blending on a roll mill, in internal mixers such as a twin-screw extruder, a Banbury mixer or a Brabender Plastograph.

The polymer compositions of this invention can be used to produce moldings, extrusions, laminates and coatings. The usual conditions employed in the art are useful in shaping the polymer compositions in the desired application.

The following examples illustrate the invention:

EXAMPLE I

Preparation of Cyclodiene-Containing Polymers

The following recipe was used for the preparation of copolymers containing 1,3-cyclohexadiene.

| | |
|---|---|
| 1,3-Cyclohexadiene, parts by weight | Variable |
| 1,3-Butadiene, parts by weight | Variable |
| Styrene, parts by weight | Variable |
| Cyclohexane, parts by weight | 546 |
| Tetrahydrofuran, parts by weight | 1 |
| DiLi-3, mehm[a] | 9 |
| Temperature, °C. | 30 |
| Time, hours | 16 |

[a]mehm = milliequivalents lithium per 100 grams monomer

All ingredients were charged initially. The polymerization was carried out under nitrogen in capped beverage bottles employing essentially anhydrous reactants and conditions. The bottles were tumbled in a constant temperature bath for the stipulated polymerization time and at the stipulated temperature. Following polymerization, 2,6-di-t-butyl-4-methylphenol (1 part by weight per hundred parts by weight of monomer) was added in a 50/50 (by volume) toluene/isopropyl alcohol solution, and the polymer coagulated by adding the reaction mixture to isopropyl alcohol. The polymer was then collected by filtration and dried under reduced pressure.

The following copolymers were prepared employing this procedure:

Table I

| Polymer No. | 1,3-Cyclohexadiene, phm[a] | 1,3-Butadiene, phm | Styrene, phm | Conversion wt. % |
|---|---|---|---|---|
| A | 100 | 0 | 0 | 85 |
| B | 90 | 10 | 0 | 88 |
| C | 80 | 0 | 20 | 87 |
| D | 60 | 0 | 40 | 88 |
| E | 60 | 10 | 30 | 89 |

[a]Parts by weight per 100 parts by weight of total monomers charged.

EXAMPLE II

Blends of Cyclodiene-Containing Polymers and Teleblock Polymers

A series of polymer blends of varying weight ratios of the cyclohexadiene-containing polymers as described in Example I and a radial block copolymer of 70/30 butadiene/styrene (Solprene 411, a trademark of and manufactured by Phillips Petroleum Company) was prepared by solution blending. Fifty grams of a mixture of the appropriate copolymers and about 500 ml. of toluene were charged to a beverage bottle and the mixture tumbled under an air atmosphere in a constant temperature bath at 50° C. for 15 to 24 hours until the copolymers were completely dissolved. This solution was then poured into isopropyl alcohol to coagulate the polymer blend, the blend collected by filtration and dried under reduced pressure.

The polymeric blends were compression molded at 280°–320° F. into sheets 0.075 inches in thickness. Dumbbell-shaped specimens machined from the polymeric sheets were tested for green tensile strength at 74° F., 122° F., and 158° F., according to the test conditions of ASTM-D-412. Results are shown in Table II.

Table II

| Run No. | Cyclohexadiene-Containing Copolymer Polymer No.[a] | Wt. % in Blend | Green Tensile, psi 74° F. | 122° F. | 158° F. | % Decrease from 74° F. Tensile 122° F. | 158° F. |
|---|---|---|---|---|---|---|---|
| 1 (Control) | — | 0 | 2,330 | 1,350 | 940 | 43 | 61 |
| 2 | A | 30 | 2,060 | 1,530 | 880 | 26 | 57 |
| 3 | A | 20 | 2,630 | 1,460 | 860 | 45 | 67 |
| 4 | A | 10 | 2,340 | 1,120 | 760 | 52 | 67 |
| 5 | B | 30 | 1,330[b] | 1,010[b] | 700[b] | 24 | 47 |
| 6 | B | 20 | 3,030 | 2,360 | 1,210 | 22 | 60 |
| 7 | B | 10 | 3,290 | 2,430 | 1,180 | 26 | 64 |
| 8 | C | 30 | 2,120 | 1,800 | 1,220 | 15 | 42 |
| 9 | C | 20 | 2,600 | 2,190 | 1,180 | 16 | 55 |
| 10 | C | 10 | 2,850 | 2,240 | 1,100 | 21 | 61 |
| 11 | D | 30 | 2,730 | 2,200 | 1,730 | 19 | 37 |
| 12 | D | 20 | 2,930 | 2,300 | 1,320 | 21 | 55 |
| 13 | D | 10 | 2,680 | 2,050 | 1,380 | 24 | 49 |
| 14 | E | 30 | 2,750 | 2,040 | 1,060 | 26 | 61 |
| 15 | E | 20 | 3,010 | 2,410 | 1,200 | 20 | 60 |

Table II-continued

| Run No. | Cyclohexadiene-Containing Copolymer | | Green Tensile, psi | | | % Decrease from 74° F. Tensile | |
|---|---|---|---|---|---|---|---|
| | Polymer No.(a) | Wt. % in Blend | 74° F. | 122° F. | 158° F. | 122° F. | 158° F. |
| 16 | E | 10 | 2,650 | 1,870 | 1,120 | 29 | 58 |

(a)From Table I
(b)The tensile strengths of this blend are abnormally low and are thought to be due to impurities introduced during blending.

These data show that blends of a cyclohexadiene-containing copolymer and a radial block copolymer, such as Solprene 411, (runs 5 through 16) have considerably higher green tensile strength at 122° F. than the block copolymer itself (run 1). The effect of the presence of the cyclohexadiene-containing copolymer is vividly shown by the percentage decrease in green tensile strength at 122° F. compared to 74° F. The Solprene 411 control loses 43% of its 78° F. green tensile strength when the temperature is elevated to 122° F., whereas there is only a 15 to 29% decrease when a cyclohexadiene-containing copolymer is present. These results are unexpected in view of the observation that blends of a cyclohexadiene homopolymer and the control block rubber Solprene 411 (blends 2, 3, and 4) do not have high temperature green tensile properties superior to the radial block copolymer alone.

The positive influence of the cyclohexadiene-containing copolymer on green tensile strength of the radial block copolymer is somewhat less pronounced at 158° F. The percentage decrease in green tensile strength from 74° F. to 158° F. does not reflect as big a difference between the blends and the block copolymer alone as was seen at 122° F. However, the absolute green tensile strengths of the blends of the instant invention are obviously superior to the absolute green tensile strength of the control radial block copolymer at 158° F., thereby providing a superior product for high temperature applications.

Reasonable variations and modifications, which will be apparent to those skilled in the art, can be made in this invention without departing from the spirit and scope thereof.

What is claimed is:

1. A process for increasing the green tensile strength of a block copolymer represented by the formula Z(B-A)$_n$ wherein A is an essentially homopolymer block of a vinyl aromatic compound and B is selected from the group consisting of an essentially homopolymer block of a conjugated diene having from 4 to 8 carbon atoms and a random copolymer block of said conjugated diene and said vinyl aromatic compound wherein the weight ratio of said vinyl aromatic compound to said conjugated diene is in the approximate range of 1:4 to 4:1, Z is derived from a polyfunctional compound having 3 or 4 reactive sites, and n is an integer having a value of 3 or 4, which comprises incorporating therewith from 5 to 100 parts of a copolymer of cyclodiene per 100 parts of said block copolymer, wherein said copolymer of cyclodiene is prepared by polymerizing a mixture of (1) from 10 to 90 weight percent of a 1,3-cyclodiene compound having from 5 to 20 carbon atoms selected from the group consisting of 1,3-cyclohexadiene and substituted derivatives thereof represented by the formula

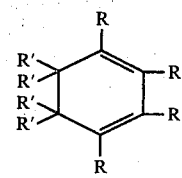

and 1,3-cyclopentadiene and substituted derivatives thereof represented by the formula

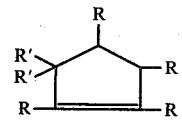

wherein in each of the above formulas each R is individually selected from the group consisting of hydrogen, methyl and ethyl, and each R' is individually selected from the group consisting of hydrogen, alkyl having from 1 to 6 carbon atoms, cycloalkyl having from 5 to 6 carbon atoms, phenyl and methylcyclopentyl, and (2) from 90 to 10 weight percent of at least one monomer selected from the group consisting of acyclic conjugated dienes having from 4 to 8 carbon atoms per molecule, vinyl-substituted aromatic compounds having from 8 to 14 carbon atoms per molecule, and mixtures thereof in which the weight ratio of said acyclic conjugated diene to said vinyl aromatic compound is in the approximate range of 99:1 to 1:99.

2. The process of claim 1 wherein said block copolymer is a block copolymer of styrene and 1,3-butadiene.

3. The process of claim 1 wherein said copolymer of cyclodiene is prepared by polymerizing from about 40–80 weight percent of said 1,3-cyclodiene compound.

4. The process of claim 1 wherein said block copolymer is a block copolymer of styrene and isoprene.

5. The process of claim 1 wherein said copolymer of cyclodiene is prepared by polymerizing a mixture of cyclohexadiene and styrene.

6. The process of claim 1 wherein said copolymer of cyclodiene is prepared by polymerizing a mixture of cyclohexadiene, styrene and 1,3-butadiene.

7. The process of claim 1 wherein said copolymer of cyclodiene is prepared by polymerizing a mixture of cyclohexadiene and 1,3-butadiene.

8. The process of claim 1 wherein the amount of said copolymer of cyclodiene is in the approximate range of 10 to 50 parts by weight per 100 parts by weight of said block copolymer.

9. A composition of matter consisting essentially of:
(a) a block copolymer represented by the formula Z(B-A)$_n$ wherein A is an essentially homopolymer block of a vinyl aromatic compound and Z is selected from the group consisting of an essentially homopolymer block of a conjugated diene having from 4 to 8 carbon atoms and a random copolymer block of said conjugated diene and said vinyl aromatic compound wherein the weight ratio of said vinyl aromatic compound to said conjugated diene is in the approximate range of 1:4 to 4:1, Z is derived from a polyfunctional compound having 3 or 4 reactive sites, and n is an integer having a value of 3 or 4, and (b) from 5 to 100 parts of a copolymer of cyclodiene per 100 parts of said block copolymer, wherein said copolymer of cyclodiene is prepared by polymerizing a mixture of (1) from 10 to 90 weight percent of 1,3-cyclodiene compound having from 5 to 20 carbon atoms selected from the group consisting of 1,3-cyclohexadiene and substituted derivatives thereof represented by the formula

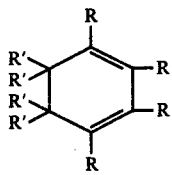

and 1,3-cyclopentadiene and substituted derivatives thereof represented by the formula

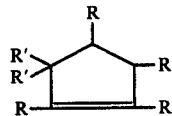

wherein each of the above formulas each R is individually selected from the group consisting of hydrogen, methyl and ethyl, and each R' is individually selected from the group consisting of hydrogen, alkyl having from 1 to 6 carbon atoms, cycloalkyl having from 5 to 6 carbon atoms, phenyl and methylcyclopentyl, and (2) from 90 to 10 weight percent of at least one monomer selected from the group consisting of acyclic conjugated dienes having from 4 to 8 carbon atoms per molecule, vinyl-substituted aromatic compounds having from 8 to 14 carbon atoms per molecule, and mixtures thereof in which the weight ratio of said acyclic conjugated diene to said vinyl aromatic compound is in the approximate range of 99:1 to 1:99.

10. The composition of claim 9 wherein said block copolymer is a block copolymer of styrene and 1,3-butadiene.

11. The composition of claim 9 wherein said block copolymer is a block copolymer of styrene and isoprene.

12. The composition of claim 9 wherein the amount of said copolymer of cyclodiene is in the approximate range of 10 to 50 parts by weight per 100 parts by weight of said block copolymer.

13. The composition of claim 9 wherein said copolymer of cyclodiene is prepared by polymerizing from about 40 to 80 weight percent of said cyclodiene.

14. The composition of claim 9 wherein said copolymer of cyclodiene is prepared by polymerizing a mixture of cyclohexadiene and styrene.

15. The composition of claim 9 wherein said copolymer of cyclodiene is prepared by polymerizing a mixture of cyclohexadiene.

16. The composition of claim 9 wherein said copolymer of cyclodiene is prepared by polymerizing a mixture of cyclohexadiene, styrene and 1,3-butadiene.

* * * * *

UNITED STATES PATENT AND TRADEMARK OFFICE
CERTIFICATE OF CORRECTION

PATENT NO. : 4,179,480

DATED : December 18, 1979

INVENTOR(S) : Henry L. Hsieh

It is certified that error appears in the above-identified patent and that said Letters Patent are hereby corrected as shown below:

Column 9, Claim 9, Line 36, after "wherein", insert --- in ---.

Signed and Sealed this

Twenty-sixth Day of August 1980

[SEAL]

Attest:

SIDNEY A. DIAMOND

*Attesting Officer*  *Commissioner of Patents and Trademarks*